Feb. 3, 1959 D. M. KING 2,871,799
CONVEYORS
Filed March 15, 1956 4 Sheets-Sheet 1

Feb. 3, 1959 — D. M. KING — 2,871,799
CONVEYORS
Filed March 15, 1956 — 4 Sheets-Sheet 2

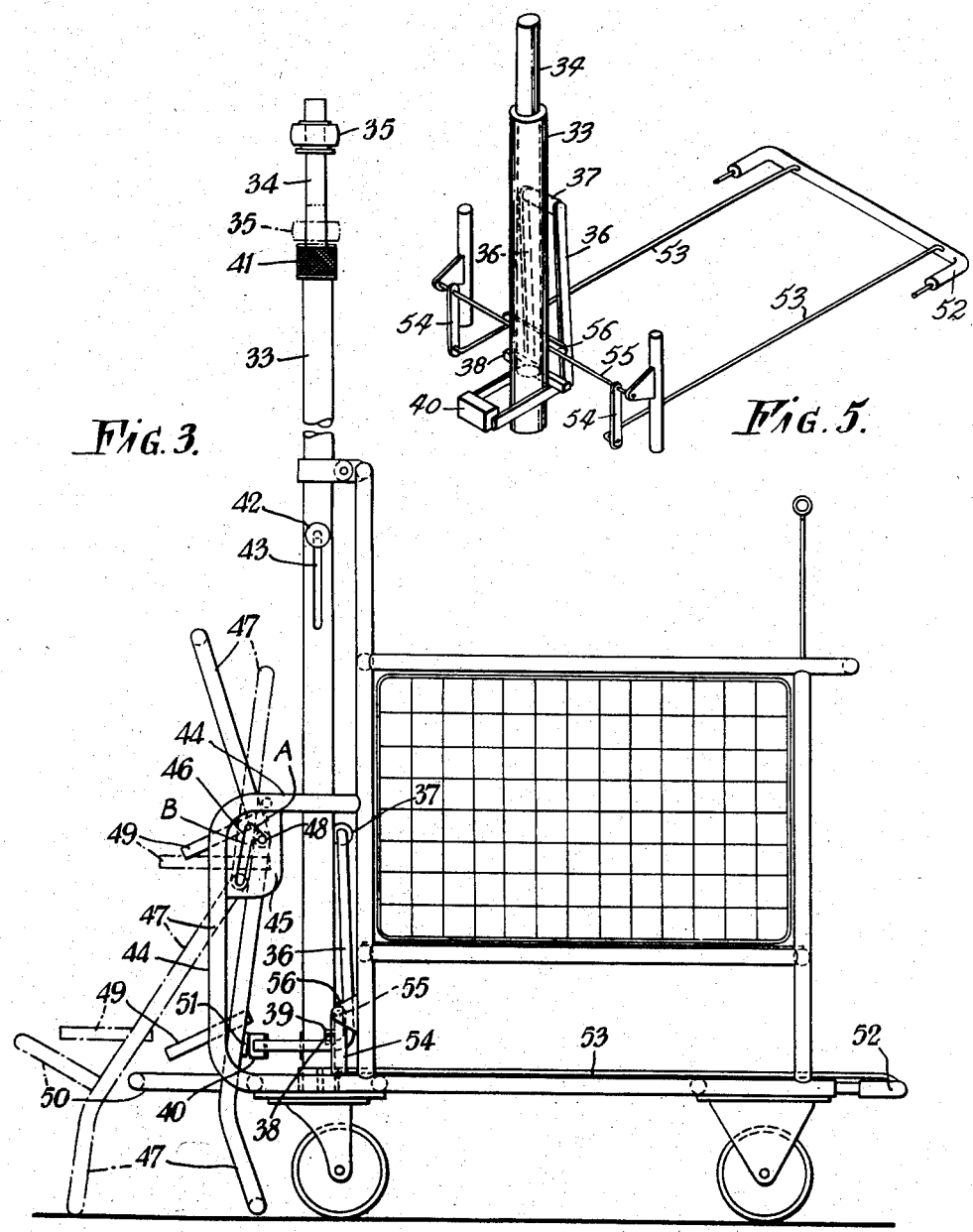

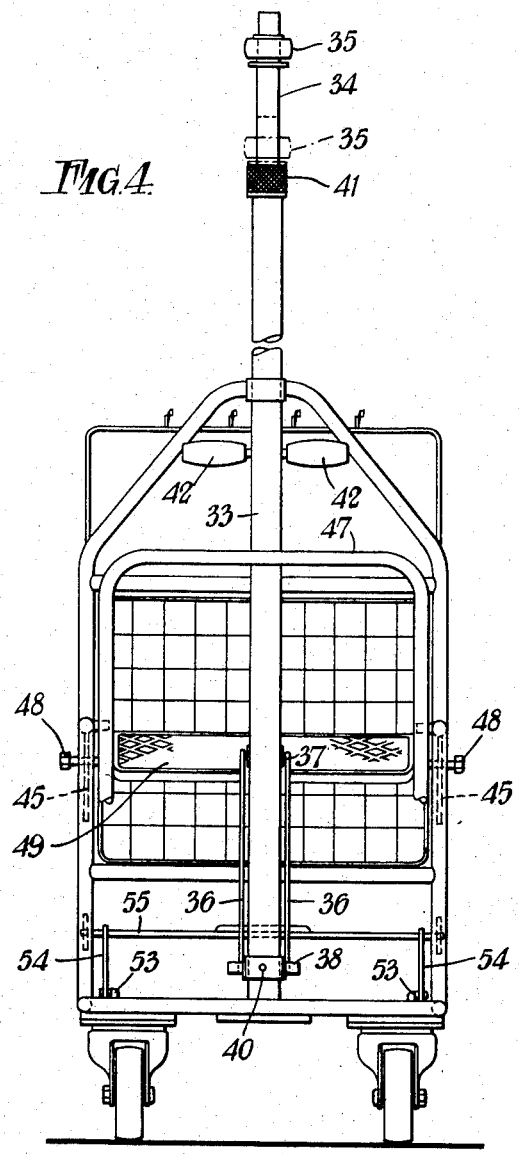

United States Patent Office 2,871,799
Patented Feb. 3, 1959

2,871,799
CONVEYORS
Donald Mayer King, Stevenage, England
Application March 15, 1956, Serial No. 571,819
Claims priority, application Great Britain March 15, 1955
9 Claims. (Cl. 104—172)

This invention relates to conveyors and more particularly to such conveyors of the kind wherein a load carrying trolley adapted to run on a floor or other surface is provided with an upstanding mast or the like which is adapted to cooperate with an overhead endless driving chain the arrangement being such that on being appropriately positioned in relation to the chain said trolley will be propelled or towed along a predetermined path by virtue of the movement of the chain.

It is an object of the present invention to evolve means which will permit of application or discontinuance of a drive to the trolley at will and will also allow for automatic discontinuance of the drive in the event that free passage of the load carrying trolley is obstructed.

According to the present invention in a conveyor of the kind set forth the upstanding mast or the like associated with the trolley includes a portion which is capable of limited upward and downward sliding movement into or from an operative position wherein the upper part thereof will cooperate with the driving chain, means being provided releasably to lock such portion in its operative position.

In order that the said invention may be clearly understood and readily carried into effect the same will be hereinafter more fully described with reference to the accompanying drawings in which:

Figure 5 is a perspective view illustrating means for disconnecting the load carrying trolley from the overhead driving means.

Figure 1:
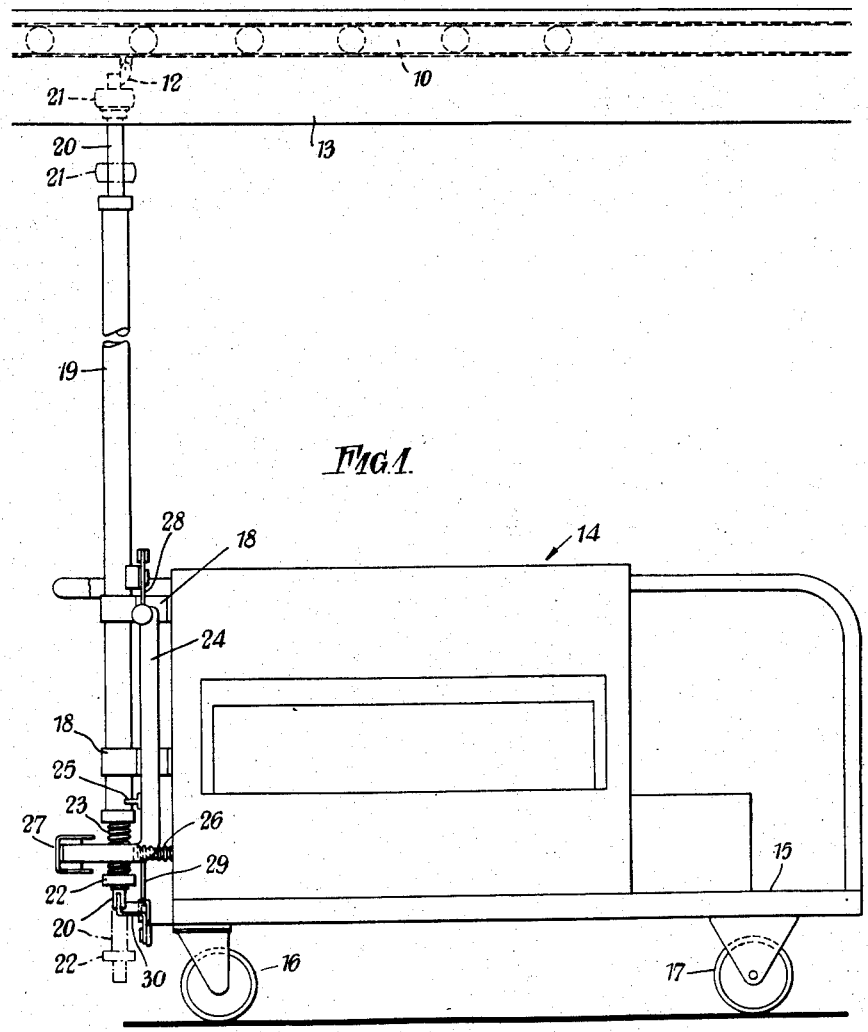
Figure 1 is a side elevational view illustrating one form of load carrying trolley and the driving means therefor.
Figure 2:
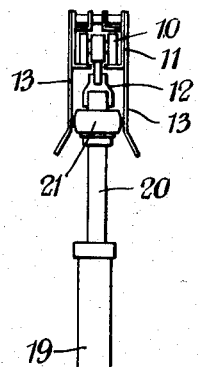
Figure 2 is an end view of the assembly shown in Figure 1, Figures 3 and 4 are side and end elevational views respectively of a modified form of load carrying trolley, certain parts in Figure 4 being broken away to permit of better illustration.
Figure 2:
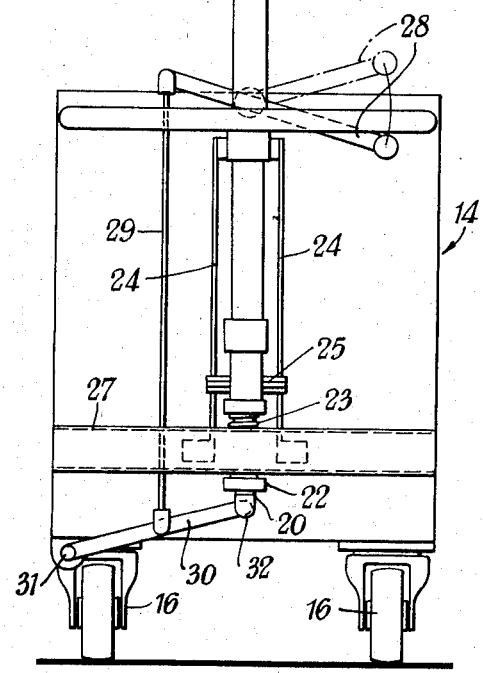

Referring now to the drawings and more particularly to Figures 1 and 2, 10 denotes an endless driven chain of known type which is arranged to run in a track 11 of rectangular or box like section such track having a longitudinally extending slot or passageway in the lower wall thereof through which driving dogs carried by said chain are adapted to project. The driving dogs are spaced at selected distances along the chain 10 and one of such dogs is indicated at 12. At zones in which a drive is to be imparted to load carrying trolleys side guide elements such as are indicated at 13 are affixed to the chain track to depend therefrom. As illustrated the guides 13 are preferably flared at their lower edges thereby to provide a lead for the entry and to control the horizontal movement of the upper end of a mast associated with each load carrying trolley.

In the embodiment shown in Figures 1 and 2, 14 generally denotes a load carrying trolley comprising essentially a load platform 15 which in the embodiment illustrated is supported at the front end on a pair of castors 16 and at the rear end on a pair of wheels 17, said wheels and castors being adapted to run on the ground, a floor or other similar surface. Supported by brackets 18 at the fore part of the trolley is a mast comprising a tubular member 19 which extends vertically and within which is disposed an inner tube or rod 20 the latter being capable of axial sliding movement within said tubular member 19. At a point adjacent its upper end the tube or rod 20 is provided with an anti-friction roller 21 adapted when said tube or rod is in its operative position as shown in Figures 1 and 2 to engage with the side guides 13. As will also be seen, when the tube or rod 20 is in its operative position the upper end thereof will lie in the path of and be engaged by one of the driving dogs 12 on the conveyor chain 10. At its lower end, the tube or rod 20 is provided with a flange or abutment 22 which is adapted to provide a seating for one end of a spring 23 the upper end of which latter bears against a flange or collar associated with the tubular member 19. The spring 23 will tend to urge the tube or rod 20 downwardly into an inoperative position indicated in chain dotted lines in Figure 1 wherein the upper end of said tube or rod will be withdrawn from the path of the driving abutments associated with the conveyor chain.

In order to maintain the tube or rod 20 in its uppermost or operative position there is provided a pair of arms 24 of substantially L shape such arms being pivotally mounted at their upper ends on the upper bracket 18 and carrying between them a latch plate 25 which is adapted normally to project through a transverse slot cut in the lower part of the tubular member 19 and to engage an appropriately disposed slot or recess in the tube or rod 20 thereby positively to hold the latter against downward displacement by the spring 23. The arms 24 are normally urged forwardly into their operative position wherein the latch plate 25 is in engagement with the slots in the members 19 and 20 by means of a spring 26. The forwardly projecting portions of the arms 24 are adapted to support a transverse bumper bar 27 which extends across the front of the trolley.

As will be appreciated from the foregoing when it is required to impart a drive to the load trolley the inner tube or rod 20 will be locked in its uppermost or operative position by the latch plate 25 and the trolley will be so positioned relatively to the overhead conveyor that the upper end of said tube or rod will be located between the side guides 13 and in the path of the driving abutments 12 on the chain 10. On engagement of one of the abutments 12 with the upper end of the tube or rod 20 the trolley will be towed or propelled along a path corresponding to that followed by the driving chain. Should it be required to discontinue the drive for any reason or should the trolley strike an obstruction which prevents further progress the bumper bar 27 will be forced rearwardly against the action of the spring 26 thereby causing the arms 24 to move angularly about their pivot and to withdraw the latch plate 25 from the slots in the members 19 and 20. Upon withdrawal of the latch plate the inner tube or rod 20 will move downwardly under the action of the spring 23 into the lowermost or inoperative position so that the drive to the load trolley will thereupon be discontinued.

In order to facilitate resetting of the tube or rod 20 in its uppermost or operative position a resetting mechanism is incorporated such mechanism comprising a pivoted operating lever 28 which is connected by means of a link 29 with a lever 30 the latter being pivotally connected at 31 to a bracket fixedly mounted on the trolley and at 32 to the lower end of the tube or rod 20. The arrangement is such that when the tube or rod 20 is in its lowermost or inoperative position the lever 28 will assume the position shown in chain dotted lines in Figure 2. To reset the tube or rod 20 it will only be necessary to depress the lever 28 into the position shown in full lines in Figure 2 whereupon the lever 30 will be caused to move said tube or rod 20 upwardly against the spring 23 into a position such that the latch plate 25 will, by reason of the action of the spring 26 snap into its operative position wherein it will project through the slot in the member 19 and engage the slot or recess in the tube or rod 20 thereby positively to lock the latter in its uppermost or operative position.

In the embodiment shown in Figures 3 and 4 the load trolley is adapted to be driven as before by an overhead driving chain. In this case the extensible mast comprises an outer tubular member 33 which is clamped in position at the fore part of the trolley in such a manner that the height setting of said member and hence of the mast as a whole will be adjustable. Slidable within the member 33 is an inner tube or rod 34 carrying as before at its upper part an anti-friction roller 35 adapted when the tube or rod 34 is in its operative position to be disposed between the side guides associated with the conveyor track. As before the upper end of the tube or rod 34 projects above the roller 35 and is adapted when said tube or rod is in its operative position to be engaged by the driving abutments on the conveyor chain. To maintain the tube or rod 34 in its operative position a pair of substantially L-shaped arms 36 is provided which arms are pivoted at 37 and carry between them a latch plate 38 the latter being adapted when said arms are in the normal position as shown to project through a slot 39 at the lower part of the tubular member 33 and to engage in a slot or recess in the tube or rod 34. Mounted on the forwardly projecting portions of the arms 36 is a pad or the like 40. If desired the arms 36 may be resiliently urged into the operative position wherein the latch plate 38 will be caused to engage in the slot or recess in the tube or rod 34. In this case the arrangement is such that on withdrawal of the latch plate 38 the inner tube or rod 34 will move downwardly under the action of gravity into a position such that the upper end thereof will be withdrawn from the path of the driving abutments and also clear of the side guides. To cushion the downward movement of the tube or rod 34 a rubber buffer element 41 is provided at the upper end of the tubular member 33. In the embodiment illustrated in Figures 3 and 4 resetting of the tube or rod 34 is effected by means of the handles 42 which are associated therewith and project through slots 43 formed in the tubular member 33.

In the embodiment shown in Figures 3 and 4 the trolley is provided with a pair of forwardly projecting frame portions 44. Fixedly mounted at the upper part of each frame portion 44 is a plate 45 having a slot 46 which is of substantially inverted J shape. Disposed between the frame portions 44 is a frame 47 formed, for example, of tubular metal. In the end elevational view as shown in Figure 4 the frame 47 is of substantially inverted U shape but as will be seen from Figure 3 in side view the legs or limbs of the U are specially shaped. Mounted on the limbs of the frame 47 are two axially aligned pins or the like 48 which are adapted to engage in the slots 46 formed in the respective plates 45. Fixedly mounted on the depending limbs of the frame 47 are two foot plates or platforms 49. Also mounted on the limbs of said frame 47 is a bumper bar or the like 50 which is adapted to project forwardly therefrom.

As will be seen from Figure 3 the frame 47 may be moved from the non-travelling position as indicated in dotted lines wherein the lower ends thereof rest on the floor and the foot plates or platforms 49 will provide the equivalent of a step ladder to a travelling position shown in full lines wherein the lower ends of said frame will be clear of the floor and the bumper bar of the like 50 will project forwardly from the trolley in a horizontal or substantially horizontal plane. It will be appreciated that the frame may be moved from the travelling position shown in full lines to the non-travelling position shown in dotted lines merely by lifting it so that the pins 48 will move upwardly in the portions A of the slots 46 until they are in a position such that on release or downward movement of said frame they will slide downwardly in the portions B. The arrangement is such that when the frame 47 is in its travelling position a transverse bar 51 will register with the pad 40 carried by the arms 36 so that in the event of inward movement of the bumper bar 50 said arms will be caused to swing rearwardly thereby to effect withdrawal of the latch plate 38 and consequent movement of the tube or rod 34 into its lowermost or inoperative position.

In the embodiment shown in Figures 3 and 4 the trolley is also provided with a rearwardly directed bumper bar 52 which is supported for limited inward and outward sliding movement relatively to the trolley, resilient means being provided adapted normally to maintain said bar in its outermost position. Connected to the bar 52 is a pair of longitudinally extending rods 53 each of which is pivotally connected at its forward end to a link 54 said links being fixedly mounted on a transverse shaft 55 which is supported for free angular or rocking movement. The shaft 55 is provided centrally with a tongue or projection 56 which is adapted on angular movement of said shaft resultant upon depression of the bumper bar 52 to cooperate with the arms 36 and to cause the latter to swing rearwardly thereby to effect withdrawal of the latch plate 38 and consequent movement of the tube or rod 34 into its lowermost or inoperative position.

Obviously in the embodiment shown in Figures 3 and 4 the inner tube or rod 34 might be spring loaded similarly to the tube or rod 20 of Figures 1 and 2, so that on withdrawal of the latch plate it would be forced downwardly into its inoperative position.

With either of the above embodiments above described it may be desirable to taper the upper end of the tube or rod 20 or 34 which is adapted to be engaged by the driving abutment on the chain in order to assist in disengagement from such abutment on withdrawal of the latch plate.

The load carrying trolleys may be caused to be diverted selectively from one conveyor to another at predetermined points by providing intermediate side guides between the two conveyors at points required and cutting away the side guides of each of the two conveyors as required to provide adequate space for a moving tongue. The said tongue may be hinged at the junction between the discontinued side guide of a conveyor and the intermediate side guide, at the point of intersection. The height of the said tongue will be such that its lower edge will be level with the bottoms of the side guides and the upper edge will be adequately clear of driving abutments of the conveyor chain in their passage over the tongue. The said tongue may have a lever extension to facilitate hand or electrical or other means of operation and in addition "a dead-centre" lever and spring system may be incorporated so that the tongue is held positively in either of its extreme positions. In operation the load carrying trolleys will move continuously along the path of one of the conveyors when the switch tongue is in one setting. For the other setting the load carrying trolleys will be diverted from the path of the conveyor into the path conforming to that of the intermediate side guides in which they can be propelled by hand until engaged by the second conveyor. Thus one setting of the tongue causes the load carrying trolleys to follow the conveyor path and the other setting of the tongue diverts them from the conveyor path as required.

The load carrying trolleys may be propelled by powered means while moving along the path prescribed by the intermediate side guides the said powered means comprising for example an air ram having a driving abutment of the free end of the ram rod arranged to engage the upper end of the inner tube of the mast. Other possible powered means include an auxiliary conveyor chain transversing the path of the intermediate side guides and towing the load carrying trolleys by means of driving abutments attached to the auxiliary chain and said chain being driven by the main conveyor chain or chains or by auxiliary powered driving gear e. g. electrical, hydraulic or pneumatic, all the chains being synchronised if necessary.

The load carrying trolleys may be caused to be diverted selectively and automatically from one conveyor to another at predetermined points by the use of selector gear of the type described in prior patent application Ser. No. 472,399 filed December 1, 1954, the said selector gear initiating operation of the tongue and operation of the auxiliary traversing means if required. Suitable interlocks of the type described in the aforesaid prior patent application Ser. No. 472,399 may be included to ensure that diversion of the load carrying trolley occurs only at the appropriate times in order that collisions between load carrying trolleys may be avoided.

What I claim is:

1. A conveyor comprising an overhead endless driving chain including depending driving abutments, a wheeled load carrying trolley freely movable over a surface at a level below that of the chain, a first mast section on the trolley, a second mast section supported by the first mast section and slidable upwardly and downwardly relatively to the first so as to be movable into and out of an operative position whereat said second section is engageable by one of the driving abutments on the chain, latch means on the trolley for pivotal movement into and out of engagement with said second mast section whereby the second mast section is locked with respect to the first in operative position, and depressible means coupled to the latch means and movably located at the fore part of the trolley for contact with an obstruction in the path of the latter to move the latch means into an inoperative position to allow the second mast section to move out of engagement with the driving chain.

2. A conveyor as claimed in claim 1 further comprising resilient means on the trolley tending normally to urge the latch element into its operative position.

3. A conveyor comprising an overhead endless driving chain including depending driving abutments, a wheeled load carrying trolley freely movable over a surface at a level below that of the chain, a first mast section on the trolley, a second mast section supported by the first section and slidable upwardly and downwardly relatively to the first for movement into and out of an operative position whereat the upper end of said second section is engageable by one of the driving abutments on the chain, arm means pivotally on the trolley for pivotal movement relatively to the first mast section, a latch element carried by said arm means and movable as a result of movement of the latter into and out of engagement with said second mast section whereby the second mast section locked with respect to the first in its operative position, and a bar rigidly on said arm means projecting forwardly of the trolley, a contact of said bar with an obstruction in the path of travel of the trolley pivoting said arm means to disengage the latch element from the second mast section to allow the second mast section to move out of engagement with the driving chain.

4. A conveyor as claimed in claim 3 further comprising resilient means on the trolley tending normally to urge the arm means into a position whereat the latch element is operative to lock said second mast section.

5. A conveyor comprising an overhead endless driving chain including depending driving abutments, a wheeled load carrying trolley freely movable over a surface at a level below that of the chain, a first mast section on the trolley, a second mast section supported by the first mast section and slidable upwardly and downwardly relatively to the first for movement into and out of an operative position whereat the upper end of said second section is engageable by one of the driving abutments on the chain, arm means pivoted on the trolley for pivotal movement relatively to the first mast section, a latch element on said arm means and movable as a result of movement of the latter into and out of an operative position whereat the second mast section is locked with respect to the first in its operative position, and frame means supported at the fore part of the trolley for pivotal movement relatively thereto, a movement of said frame means relatively to said trolley upon contact with an obstruction in the path of the latter pivoting said arm means to move the latch element to inoperative position whereby the second mast section moves out of engagement with the driving chain.

6. A conveyor as claimed in claim 5 in which the frame means includes platform means coupled to said arm means pivotal on said trolley and supported for being moved from a stationary position wherein it rests on the surface on which the trolley is supported to a travelling position whereat it is clear of said surface for pivotal movement to actuate said arm means.

7. A conveyor comprising an overhead endless driving chain including depending driving abutments, a wheeled load carrying trolley having fore and aft ends and freely movable over a surface at a level below that of the chain, a first mast section on the trolley, a second mast section supported by the first mast section and slidable upwardly and downwardly relatively to the first for movement into and out of an operative position whereat the upper end of said second section is engageable with one of the driving abutments on the chain, latch means pivotally supported on the trolley for pivotal movement into and out of an operative position whereat said second mast section is engaged and locked with respect to the first in operative position, depressible elements on the fore and aft ends of the trolley, and means coupling the latch means with the depressible elements so that depression of either of said elements retracts the latch means into inoperative position to allow the second mast section to move out of engagement with the driving chain.

8. A conveyor comprising an overhead endless driving chain including depending driving abutments, a wheeled load carrying trolley freely movable over a surface at a level below that of the chain, a hollow mast section on said trolley and having an aperture in the wall thereof, a second mast section slidable within said hollow mast section for movement into and out of an operative position whereat the upper part of said second section is engageable with one of the driving abutments on the chain, said second mast section having a recess therein positioned to register with the aperture in the hollow mast section with said second mast section in its operative position, latch means pivotally supported on the trolley and including a latch element for pivotal movement into and out of an operative position whereat the latch element projects through the aperture in the hollow mast section and engages the recess in the second mast section, and depressible means at at least one end of the trolley and coupled to the latch means and adapted on depression to actuate the lach means to retract the latch element to allow said second mast section to move out of engagement with the driving chain.

9. A conveyor as claimed in claim 8 and further comprising spring means on the mast sections to urge said second mast section into inoperative position.

References Cited in the file of this patent

UNITED STATES PATENTS

| | | |
|---|---|---|
| 2,022,186 | Butler | Nov. 26, 1935 |
| 2,601,477 | Webb et al. | June 24, 1952 |
| 2,619,370 | Leger | Nov. 25, 1952 |
| 2,619,916 | Rainier | Dec. 2, 1952 |
| 2,635,555 | Hansson | Apr. 21, 1953 |
| 2,708,886 | Neely | May 24, 1955 |
| 2,760,441 | Kunick | Aug. 28, 1956 |